Oct. 11, 1966

M. PETTY 3,278,116

STRUCTURAL MEMBERS

Filed May 8, 1962

Macon Petty
INVENTOR.

BY Browning, Semme, Ayer & Eickenroht

ATTORNEYS

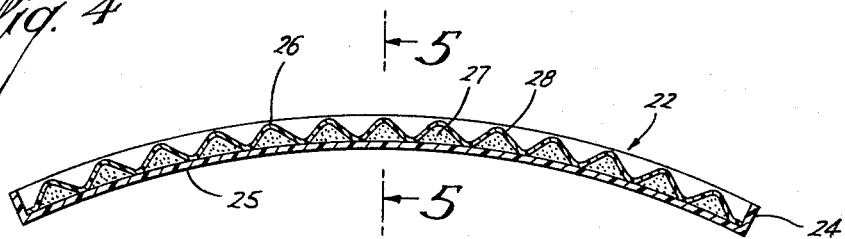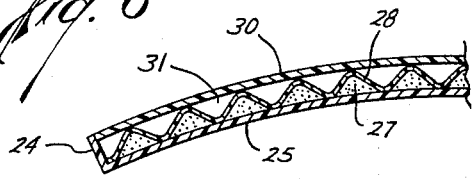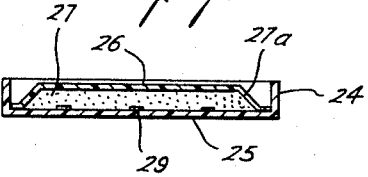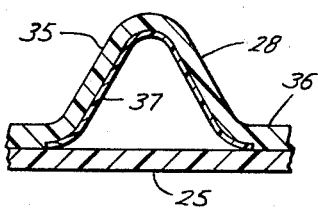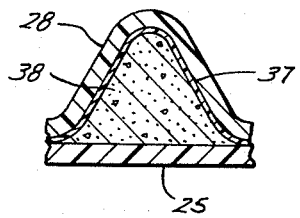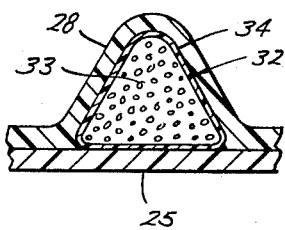

United States Patent Office 3,278,116
Patented Oct. 11, 1966.

3,278,116
STRUCTURAL MEMBERS
Macon Petty, Wichita, Kans., assignor to Hudson Engineering Corporation, Houston, Tex., a corporation of Texas
Filed May 8, 1962, Ser. No. 193,176
6 Claims. (Cl. 230—133)

This invention relates in general to structural members. In one of its aspects, it relates to improved structural members which are resistant to corrosion and vibration; and, more particularly, which will withstand the shockwaves created by supersonic aircraft and/or shield against radiation. In another of its aspects, it relates to novel methods of making such structural members.

Many plastics are not only corrosion resistant, but also quite suitable for structural use, particularly when reinforced with fiberglass or the line. In many cases, however, structural members of this type are used in environments which are also subject to considerable vibration. This is true, for example, when they are used as parts of rings which surround large fans in cooling towers, where there is maximum exposure to both corrosion and vibration. In order to withstand such vibration, these members have been stiffened by means of solid reinforced plastic ribs welded thereto. Although this adds the stiffness desired, it also adds strength, which is not needed, and increases the cost of the members considerably.

The plastic structural members now available at a reasonable cost for use as a wall panel or for skylighting are of such light weight that they actually amplify the sockwaves above mentioned. Also, these members provide little or no protection against radiation.

An object of this invention is to provide a reinforced plastic structural member which is made appreciably more resistant to vibration than conventional members of this type with only a slight increase in cost.

Another object is to provide such a member which has stiffening ribs which add a maximum of weight with only minimum added expense; and, more particularly, which add must more weight per unit of cost than solid ribs of the same reinforced plastic material.

A further object is to provide a method for making structural members having such ribs which is simple and quick in execution.

Still another object is to provide a reinforced plastic structural member having stiffening ribs with forms of such construction as to greatly facilitate handling as well as a desired arrangement thereof.

A still further object is to provide a fan ring made up at least in part of reinforced plastic structural mebers having one or more of the aforementioned characteristics.

Yet another object is to provide an inexpensive structural member of this type which is suitable for fairly heavy construction, is excellent insulation against sound, is capable of withstanding the shock of sonic booms, and is a shield against radiation.

These and other object are accomplished, in accordance with the illustrated embodiments of the present invention, by means of a structural member having stiffening ribs arranged in side-by-side relation on a base sheet of reinforced plastic material. These ribs comprise laterally spaced-apart bodies of heavy, low cost material and a layer of the same material as the base sheet disposed over the bodies and joined to such base sheet on opposite side edges of said bodies. The terms "heavy" and "low cost" are used in a relative sense, at least to some extent, to describe a material which is heavier and less expensive per unit of volume than the reinforced plastic material of which the ribs have heretofore been formed. The weight of a body of such material, when secured to the base sheet as part of a stiffening rib, thus provides added resistance to vibration, and insulation against sound. At the same time, when enclosed within the base sheet and layer of reinforced plastic material, the heavy material need not have any particular corrosion resisting characteristics.

For example, the bodies may comprise a precast material such as concrete, or they may comprise a flowable material, such as sand or shot, contained within an envelope shaped according to the ribs to be formed. When the member is to shield against radiation, a dense material such as lead, barite or an extruded plastic may be used. In any case, the bodies are initially arranged on the base sheet to act as forms over which the layer conforms as it is disposed thereover.

This invention also contemplates that the layer of reinforced plastic material may be preformed into spaced-apart arches over the base sheet, and such arches may then be filled with the desired heavy, low cost material to form the ribs. Although such material may be precast concrete or the like, as in the method above mentioned, it is preferably a flowable material, such as wet concrete, which will solidify within such arches.

When the structural member is to be curved, the ribs are preferably extended in the direction of the axis of curvature of the base sheet as this permits the form bodies to be made flat. In their preferred form, the form bodies are interconnected by ties which not only facilitate their handling as a group, but also properly space the ribs to be formed when drawn tautly between the forms.

In the drawings, wherein like reference characters are used throughout to designate like parts:

FIG. 4 is a view similar to FIG. 3, but with a layer of reinforced plastic material disposed over the forms and joined to the base sheet in the spaces between the forms to secure the stiffening ribs thereto;

FIG. 5 is a cross-sectional view of the structural member of FIG. 4, as seen along broken line 5—5 thereof;

FIG. 6 is an end view of a modified embodiment of the structural member of FIG. 5 which is more suitable as a building panel for heavier construction and which provides greater sound insulation and radiation shielding;

FIG. 7 is an enlarged sectional view of part of another embodiment of structural member made in accordance with the present invention, which is similar to the member of FIG. 5 except that the form comprises granular material disposed within an envelope or casing;

FIG. 8 is a cross-sectional view of still another embodiment of the invention during the method of making same wherein a layer is preformed to provide an arch above the base sheet; and FIG. 9 is a view similar to FIG. 8 showing the further step in the manufacture of such member wherein the arch is filled with a castable material.

Figure 1:
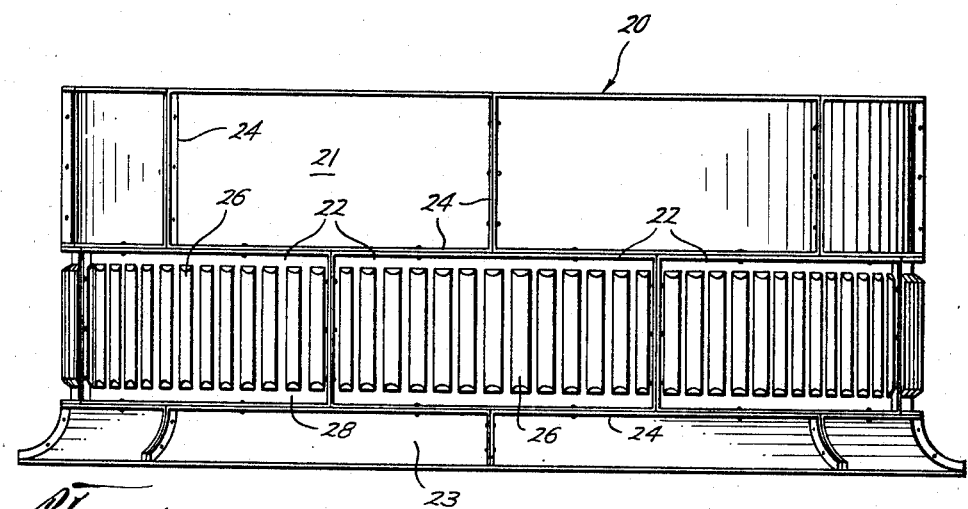
FIG. 1 is a side elevational view of a fan ring constructed at least in part of reinforced plastic members made in accordance with the present invention.

With reference now to the above-described drawings, the ring 20 shown in FIG. 1 is made up of a plurality of vertically disposed rows of arcuate structural members 21, 22 and 23 which are connected together in edge-to-edge relation by means of bolted flanges 24 to form a cylindrical body. As well known in the art, the lower row of arcuate members 23 is disposed about an opening in cooling tower equipment, and a large fan (not shown).

is mounted in an intermediate portion of the ring for rotation about a vertical axis of the ring. Since these fans may be as large as 18 or 19 feet in diameter, and since they are run substantially continuously, it is understandable that the ring 20 is subjected to severe pulsations. Also, since the ring is normally open to the atmosphere above the cooling tower, it is subjected to very severe corrosive effects. For this reason, the structural members of the present invention are particularly well suited for this use, although it will be understood that such members may be used in other environments.

The upper and lower rows of structural members 21 and 23, respectively, may comprise one or more sheets of reinforced plastic material commonly employed for this purpose. As previously mentioned, at least a portion of the ring 20, and preferably the intermediate row of members 22 which are laterally opposite the fan, are constructed in accordance with the present invention. For this purpose, and as will be described more fully hereinafter, each such member has a plurality of stiffening ribs 26 arranged in side-by-side relation thereon. More particularly, and with reference to FIGS. 3 and 4, these ribs comprise laterally spaced-apart forms 27 on a base sheet 25 of reinforced plastic material and a layer 28 of similar material disposed over said forms and joined to the base sheet on opposite side edges of the forms. However, when the member is intended to provide diffused lighting, only alternate ones of the ribs may be weighted with a form of heavy material.

Figure 2:
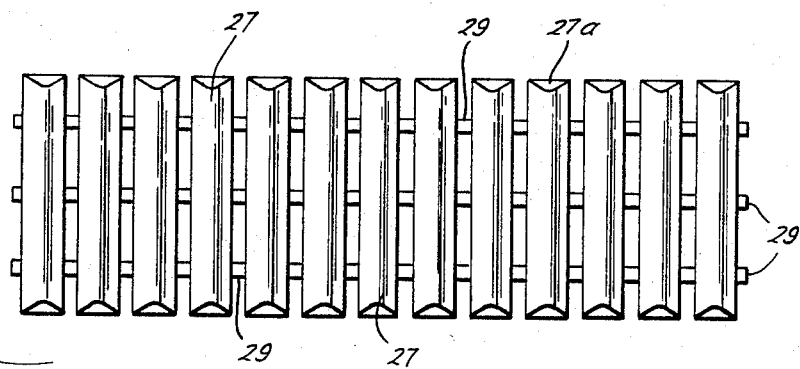
FIG. 2 is a top plan view of a preferred arrangement of laterally spaced-apart precast bodies for use as rib forms in making a structural member in accordance with this invention.

As can be seen from FIG. 1, these stiffening ribs 26 extend in the same direction as the axis of the curvature of each structural member 22 so that, as previously described, each form 27 may be flat or straight. Also, these forms may be of identical width and length, as shown in FIG. 2, so as to in turn form identically sized stiffening ribs 26. The ribs are also preferably equally spaced apart from one another, which is made possible by equal spacing of the forms 27. Furthermore, and again as shown in FIG. 1, the opposite ends of the identical ribs are aligned horizontally and spaced equally from the upper and lower flanges 24 on each arcuate member 22.

With reference now to the details of FIGS. 2 to 5, which illustrate the preferred method of manufacturing the structural members 22, the connecting flanges 24 are formed integrally on the base sheet although the structural member may obviously be used in environments which require neither the flanges nor the curvature of the base sheet. In any case, however, the base sheet is made of reinforcing material such as fiberglass which is impregnated or saturated with a suitable liquid resin. The particular material used is unimportant insofar as the present invention is concerned, as long as it is relatively rigid, durable and resistant to corrosion.

Figure 3:
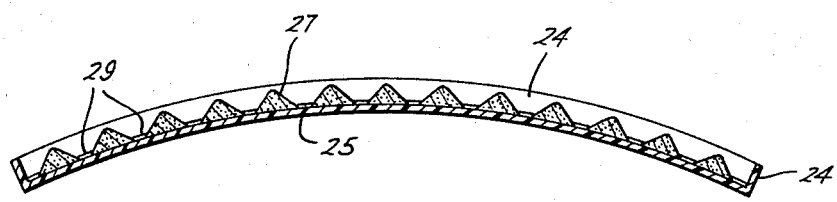
FIG. 3 is a side elevational view of the forms of FIG. 2 disposed upon a base sheet of reinforced plastic material during an initial step in the manufacture of such a structural member.

In the preferred embodiment of the forms 27 shown in FIGS. 3 to 5, each comprises a body of fine aggregate concrete precast into a shape which is triangular in cross section so there are no sharp corners over which the layer 28 is to be disposed. For a same purpose, the opposite ends of each form body are tapered as shown at 27a. Obviously, although concrete provides the rib with no particular strength, at least in comparison to reinforced plastic material, it does add considerably to its weight and thereby stiffens it against vibration. Also, concrete is considerably less expensive than the reinforced plastic material making up the remainder of the structural member 22. If less weight is needed, the concrete may be formed. Also, tile would provide another very satisfactory precast form material. It is also contemplated that such form may be made of resin bonded sand, or other granular material cast in a liquid binder of some type. Still further, and as previously mentioned, the heavy material may be lead, barite or an extruded material having considerable density when the member is to shield against radiation.

In the preferred form of FIG. 2, the forms 27 are connected together by means of a tie 29 which may be a flexible fabric. In this case, there are three equally spaced-apart ties 29 each of which is cast into the forms 27 so as to eliminate the necessity of separately joining them. These ties not only facilitate the general handling of the forms 27, but, more importantly, they also serve to locate them in a predetermined fashion. Thus, as shown in FIG. 3, when the interconnected forms 27 are disposed upon the base sheet 25, the ties 29 are drawn tautly so as to thereby space the forms in the manner desired. Another advantage of flexible ties of this type is that they permit the forms to be laid up over a base sheet of any curvature, at least about the axis shown.

As shown in FIG. 4, a layer 28 of reinforced plastic material similar to the material of base sheet 25 is now disposed over the forms and joined to the base sheet on opposite side edges of such forms to complete the ribs and fasten them to the base sheet. If in sheet form, the layer 28 is flexible to permit it to conform to the undulating surface presented by the upper ends of the forms 27. When laid up in the manner described, the flexible sheet may then be welded to the base sheet by curing in a well-known manner. Obviously, however, the layer may be joined to the base sheet by a binder of any suitable type. It is further contemplated that the layer 28 may be initially disposed over the forms on the base sheet in liquid form, as by spraying or the like. Then, the liquid resin will be welded to the base sheet when it hardens.

In any case, it is contemplated that layer 28 will cover the tapered ends 27a of the forms 27 and be joined to the base sheet 25 adjacent thereto, as shown in FIG. 5. Obviously, the layer 28 may also be joined in the form 27, although this is not essential as long as it fits closely thereabout so that the vibration would not cause the forms to move about loosely within the layer.

In the modified embodiment of structural member shown in FIG. 6, there are a pair of spaced-apart sheets of reinforced plastic material with stiffening ribs disposed therebetween so as to provide a panel which may be used in heavier construction and which is capable of even greater sound insulating and radiation shielding properties than the structural member 22 of FIG. 4. This panel is preferably comprised in part by the structural member above described, so that, as shown in FIG. 6, the lower of the spaced-apart sheets of reinforced plastic material comprises a base sheet 25 and alternate ones of the stiffening ribs comprise the forms 27 on such base sheet with the layer 28 of reinforced plastic material thereover. As in the case of the structural member of FIG. 4, the forms 27 may be connected by the ties 29 and the layer 28 is joined to the base sheet intermediate the side edges of the spaced-apart forms. The remainder of the panel is made up of parts substantially identical to such structural member, except for the layer of reinforced plastic material, which covers the forms on both sheets and, in fact, connects them together. Thus, there is another sheet 30 of reinforced plastic material having forms 31 adjacent thereto and preferably spaced apart in predetermined relation by means of tautly drawn ties (not shown).

In the manufacture of this panel, the interconnected forms 31 may be inverted, as shown, and arranged intermediate the forms 27, the size and spacing of these forms conveniently being identical to the size and spacing of the forms 27. At this time, the sheet 30 is disposed on the forms 31 and adjacent the portions of the layer 28 opposite the portion of the base sheet 25 on which the forms 27 are disposed. Then, the sheet 30 may be joined to such uppermost portions of the layer 28 in any manner previously described in connection with the joinder of such layer to the base sheet 25. Thus, the completed panel comprises a pair of spaced-apart sheets having contiguous stiffening ribs disposed therebetween and joined to the sheets by the layer of reinforced plastic material common thereto.

In the embodiment of structural member shown in FIG. 7, the form 32 comprises a body made up of flowable material, such as granules of sand or shot, enclosed within an envelope or casing 34. The casing has sufficient stiffness to retain its shape which may, for example, be substantially triangular in cross section similarly to the form 27. When the forms 32 are disposed upon the base sheet 25, the layer 28 of reinforced plastic material is disposed thereover and joined to the base sheet in the manner previously described in connection with the structural member 22 of FIG. 4. Instead of being hollow, the envelope may be honeycombed in the direction of its length.

In accordance with a still further embodiment of the invention shown in FIGS. 8 and 9, the layer 28 may be preformed into arches 35 over the base sheet 25, with the portions 36 of such layer intermediate the arches joined to such base sheet. For this purpose, and as described in more detail in my copending application, Serial No. 818,696, filed June 8, 1958, and entitled, "Rib Forming Method," the layer 28 may be disposed over a thin metallic form 37 bent into the shape of arch desired.

With the layer 28 so preformed over and joined to the base sheet 25, the hollow space within the arch 35 may be filled by a flowable material, such as concrete, and permitted to solidify therein so as to complete the weighted stiffening rib. Of course, this hollow space may also be filled with precast forms, or forms such as the one shown at 32 in FIG. 7. However, in the event preforms of this type are used, it is preferred to employ the method described in connection with FIGS. 1 to 7, because this does not require the additional preforming of the layer 26 and is thus quicker and less expensive.

From the foregoing it will be understood that this invention is one well adapted to attain all of the ends and objects herein set forth, together with other advantages which are obvious and which are inherent to the article and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A fan ring, comprising arcuate structural members connected together in edge-to-edge relation to form a cylindrical body, at least some of said members comprising a relatively rigid base sheet of reinforced plastic material having a plurality of stiffening ribs arranged in side-by-side relation thereon, said ribs comprising laterally spaced-apart bodies of heavy, low cost material on the base sheet and a layer of reinforced plastic material disposed over said bodies and joined to the base sheet on opposite side edges of the bodies.

2. A fan ring of the character defined in claim 1, wherein each layer is also joined to the base sheet on opposite ends of the bodies.

3. A fan ring of the character defined in claim 1, wherein said rib bodies comprise forms for each layer which extend longitudinally of the axis of the cylindrical fan ring body.

4. A fan ring of the character defined in claim 1, wherein said rib bodies are connected together by ties extending tautly therebetween.

5. A fan ring of the character defined in claim 4, wherein said rib bodies are concrete and the ties are cast therein.

6. A fan ring of the character defined in claim 4, wherein said rib bodies comprise granular material contained in an envelope.

References Cited by the Examiner

UNITED STATES PATENTS

| 2,198,885 | 4/1940 | Price | 161—139 |
|---|---|---|---|
| 2,715,596 | 8/1955 | Hawley | 161—119 |
| 2,973,295 | 2/1961 | Rodgers | 161—121 |

FOREIGN PATENTS 831,314   2/1952   Germany.

MARK NEWMAN, *Primary Examiner.*

EARL M. BERGERT, SAMUEL LEVINE, *Examiners.*

R. E. SMITH, H. F. RADUAZO, *Assistant Examiner.*